United States Patent
Dai et al.

(10) Patent No.: US 12,520,380 B2
(45) Date of Patent: Jan. 6, 2026

(54) METHOD AND APPARATUS FOR MULTICAST AND BROADCAST SERVICES

(71) Applicant: Lenovo (Beijing) Limited, Beijing (CN)

(72) Inventors: Mingzeng Dai, Shanghai (CN); Congchi Zhang, Shanghai (CN); Lianhai Wu, Beijing (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 358 days.

(21) Appl. No.: 18/248,701

(22) PCT Filed: Oct. 16, 2020

(86) PCT No.: PCT/CN2020/121528
§ 371 (c)(1),
(2) Date: Apr. 12, 2023

(87) PCT Pub. No.: WO2022/077442
PCT Pub. Date: Apr. 21, 2022

(65) Prior Publication Data
US 2023/0397299 A1    Dec. 7, 2023

(51) Int. Cl.
*H04W 4/06*     (2009.01)
*H04W 76/27*    (2018.01)
*H04W 76/40*    (2018.01)

(52) U.S. Cl.
CPC ............ *H04W 76/40* (2018.02); *H04W 4/06* (2013.01); *H04W 76/27* (2018.02)

(58) Field of Classification Search
CPC ..... H04W 76/40; H04W 76/27; H04W 76/34; H04W 72/1263; H04W 76/19; H04W 76/30; H04W 72/30; H04W 4/06
See application file for complete search history.

(56) References Cited

U.S. PATENT DOCUMENTS

2021/0392467 A1*   12/2021   Kim ................... H04W 76/40

FOREIGN PATENT DOCUMENTS

| CN | 102413431 A | 4/2012 |
|----|-------------|--------|
| CN | 104936149 A | 9/2015 |

(Continued)

OTHER PUBLICATIONS

"User Equipment (UE) procedures in Idle mode and RRC Inactive state", 3GPP TS 38.304 V16.2.0 [retrieved May 22, 2023]. Retrieved from the Internet <https://portal.3gpp.org/desktopmodules/Specifications/SpecificationDetails.aspx?specificationId=3192>., Sep. 2020, 39 Pages.

(Continued)

*Primary Examiner* — Tu X Nguyen
(74) *Attorney, Agent, or Firm* — FIG. 1 Patents (57) ABSTRACT

Embodiments of the present application are related to a method and apparatus for multicast and broadcast services (MBS). According an embodiment of the present application, an exemplary method includes: receiving a first MBS configuration; using the first MBS configuration for MBS data reception in a first radio resource control (RRC) state; and in response to a RRC state transition occurring, at least before entering a second RRC state from the first RRC state, continuing using the first MBS configuration for MBS data reception, or suspending MBS data reception.

20 Claims, 8 Drawing Sheets

(56) References Cited

FOREIGN PATENT DOCUMENTS

| CN | 107231619 A | | 10/2017 | | |
|---|---|---|---|---|---|
| EP | 4142399 A | | 3/2023 | | |
| KR | 20220135564 A | * | 10/2022 | ........... | H04L 1/1832 |

OTHER PUBLICATIONS

ITRI, "Remaining issue on groupcast RRC state transition and future p-t-M delivery", 3GPP TSG RAN WG2 Meeting #110-e, R2-2005208, Electronic Meeting [retrieved May 22, 2023]. Retrieved from the Internet <https://www.3gpp.org/ftp/TSG_RAN/WG2_RL2/TSGR2_110-e/Docs/?sortby=name>., Jun. 2020, 2 Pages.

PCT/CN2020/121528, "International Preliminary Report on Patentability", PCT Application No. PCT/CN2020/121528, Apr. 27, 2023, 5 pages.

PCT/CN2020/121528, "International Search Report and Written Opinion", PCT Application No. PCT/CN2020/121528, Jul. 29, 2021, 6 pages.

20957220.5, "European Search Report", Application No. 20957220.5, Jun. 19, 2024, 14 pages.

Huawei, Hisilicon, "Discussion on multicast support for Idle/Inactive UEs", 3GPP TSG RAN WG1 Meeting #102-e R1-2005272 Mobile Competence Centre ; 650, Route Des Lucioles ; F-06921 Sophia-Antipolis Cedex ; France, Aug. 17, 2020, 3 pages.

Huawei, Hisilicon, "Resource configuration and group scheduling for RRC_Connected UEs", 3GPP TSG RAN WG1 Meeting #102-e R1-2005249 3rd Generation Partnership Project (3GPP), Mobile Competence Centre ; 650, Route Des Lucioles ; F-06921 Sophia-Antipolis Cedex ; France, Aug. 17, 2020, 5 pages.

* cited by examiner

METHOD AND APPARATUS FOR MULTICAST AND BROADCAST SERVICES

TECHNICAL FIELD

Embodiments of the present application generally relate to wireless communication technology, especially to a method and apparatus for multicast and broadcast services (MBS).

BACKGROUND

In new radio (NR) R17, MBS plans to focus on a small area mixed mode multicast (also referred to as Objective A in the TR 23.757). The Objective A is about enabling general MBS services over 5G system (5GS) and the identified use cases that could benefit from this feature. These use cases include but are not limited to: public safety and mission critical, vehicle to everything (V2X) applications, transparent internet protocol version 4 (IPv4)/internet protocol version 6 (IPv6) multicast delivery, internet protocol television (IPTV), software delivery over wireless, group communications and internet of things (IoT) applications. In these use cases, the requirements for service continuity and reliability have changed. In order to support the above requirements, one objective introduced in RP-201038 is: specify support for dynamic change of Broadcast/Multicast service delivery between multicast (e.g., point to multipoint (PTM) mode) and unicast (e.g., point to point (PTP) mode) with service continuity for a given user equipment (UE).

Meanwhile, the work item on NR support of MBS was also agreed in R17 (e.g., RP-201038), wherein all radio resource control (RRC) states, i.e., RRC_IDLE state, RRC_INACTIVE state and RRC_CONNECTED state will be supported in MBS. However, various issues, e.g., service interruption, data loss, or large delay etc. will happen during the transition between different RRC states.

Thus, an improved technical solution for MSB during RRC state transition should be seriously considered.

SUMMARY OF THE DISCLOSURE

One objective of the present application is to provide a method and apparatus for MSB, especially for MBS supporting RRC state transition.

According to some embodiments of the present application, an exemplary method may include: receiving a first MBS configuration; using the first MBS configuration for MBS data reception in a first RRC state; and in response to a RRC state transition occurring, at least before entering a second RRC state from the first RRC state, continuing using the first MBS configuration for MBS data reception, or suspending MBS data reception.

In some embodiments of the present application, the first RRC state is one of RRC_IDLE state and RRC_INACTIVE state, and the second RRC state is RRC_CONNECTED state. In some other embodiments of the present application, the first RRC state is RRC_CONNECTED state, and the second RRC state is one of RRC_IDLE state and RRC_INACTIVE state. When the second RRC state is RRC_CONNECTED state, entering the second RRC state is identified by receiving a RRCSetup message or a RRCResume message.

According to some embodiments of the present application, in the case that the first RRC state is one of RRC_IDLE state and RRC_INACTIVE state, and the second RRC state is RRC_CONNECTED state, the method may include: transmitting a MBS indication on MBS data reception during an initial access procedure, wherein, the MBS indication on MBS data reception is to indicate that a UE is receiving MBS data of one or more MBS sessions or the UE is interested in receiving the MBS data of one or more MBS sessions.

In some embodiments of the present application, in the case that the first RRC state is one of RRC_IDLE state and RRC_INACTIVE state, and the second RRC state is RRC_CONNECTED state, the method may include: continuing using the first MBS configuration for MBS data reception until entering the second RRC state.

In some other embodiments of the present application, in the case that the first RRC state is one of RRC_IDLE state and RRC_INACTIVE state, and the second RRC state is RRC_CONNECTED state, the method may include: continuing using the first MBS configuration for MBS data reception until acquiring a second MBS configuration in the second RRC state. The first MBS configuration may indicate a first bandwidth part (BWP), and the second MBS configuration indicates a second BWP compatible with the first BWP.

In some yet other embodiments of the present application, in the case that the first RRC state is one of RRC_IDLE state and RRC_INACTIVE state, and the second RRC state is RRC_CONNECTED state, the method may include: continuing using the first MBS configuration for an existing MBS session until a new MBS session starting.

Acquiring the second MBS configuration can be performed in various manners. For example, according to some embodiments of the present application, acquiring the second MBS configuration may include: receiving full configuration of the second MBS configuration. According to some other embodiments of the present application, acquiring the second MBS configuration may include: receiving a different delta configuration of the second MBS configuration compared with the first MBS configuration; and updating a delta configuration of the first MBS configuration with the different delta configuration to achieve the second MBS configuration. According to some yet other embodiments of the present application, acquiring the second MBS configuration may include: receiving a keeping indication indicating still using the first MBS configuration for MBS data reception.

According to some other embodiments of the present application, in the case that the first RRC state is RRC_CONNECTED state, and the second RRC state is one of RRC_IDLE state and RRC_INACTIVE state, the method may include: continuing using the first MBS configuration until one of the following occurs: a common MBS configuration is acquired; a multicast control channel (MCCH) or system information block (SIB) for MBS configuration is updated; and a timer associated with the first MBS configuration expires.

According to some yet other embodiments of the present application, in the case that the first RRC state is one of RRC_IDLE state and RRC_INACTIVE state, and the second RRC state is RRC_CONNECTED state, the method may include: transmitting a reception status report on MBS data in the second RRC state before suspending the MBS data reception or when resuming the MBS data reception; and receiving lost MBS data caused by suspending the MBS data reception. The reception status report on MBS data may be a packet data convergence protocol (PDCP) status report. The lost MBS data may be received by a dedicated bearer or point to point (PTP) bearer.

In addition, an embodiment of the present application also provides an apparatus for performing a method according to an embodiment of the present application, e.g., a method as stated above. An exemplary apparatus may include: at least one non-transitory computer-readable medium having stored thereon computer-executable instructions; at least one receiving circuitry; at least one transmitting circuitry; and at least one processor coupled to the at least one non-transitory computer-readable medium, the at least one receiving circuitry and the at least one transmitting circuitry. The computer-executable instructions cause the at least one processor to implement any method according to an embodiment of the present application with the at least one receiving circuitry and the at least one transmitting circuitry.

Embodiments of the present application can solve the technical problems occurring during RRC state transition in MBS, and will facilitate the deployment and implementation of the NR.

BRIEF DESCRIPTION OF THE DRAWINGS

In order to describe the manner in which the advantages and features of the disclosure can be obtained, a description of the disclosure is rendered by reference to specific embodiments thereof, which are illustrated in the appended drawings. These drawings depict only exemplary embodiments of the disclosure and are not therefore to be considered limiting of its scope.

DETAILED DESCRIPTION

The detailed description of the appended drawings is intended as a description of the preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3rd generation partnership project (3GPP) 5G, 3GPP long term evolution (LTE), and so on. It is contemplated that along with the developments of network architectures and new service scenarios, all embodiments in the present application are also applicable to similar technical problems; and moreover, the terminologies recited in the present application may change, which should not affect the principle of the present application.

Figure 1:
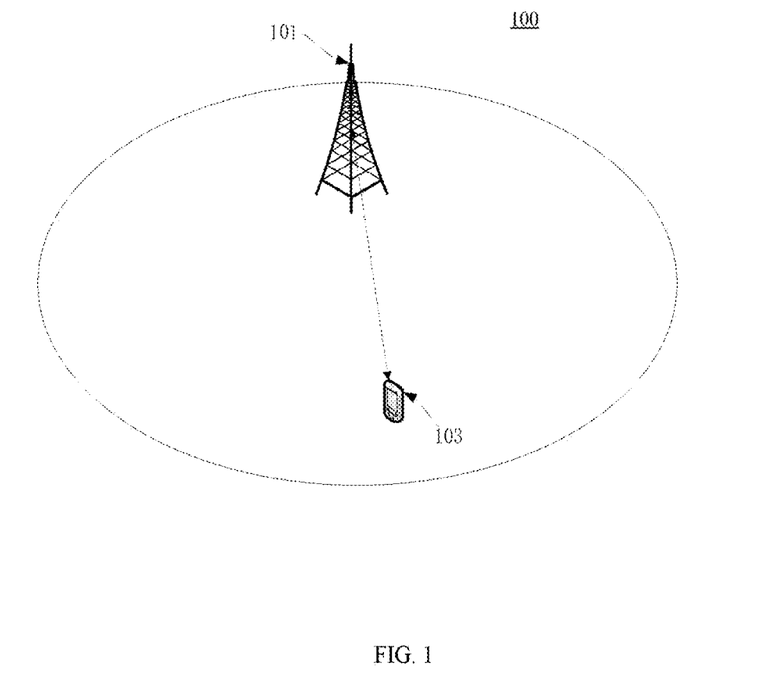
FIG. 1 is a schematic diagram illustrating an exemplary wireless communication system according to some embodiments of the present application.

FIG. 1 illustrates a schematic diagram of an exemplary wireless communication system 100 according to some embodiments of the present application.

As shown in FIG. 1, the wireless communication system 100 includes a BS 101 and a UE 103. Although merely one BS is illustrated in FIG. 1 for simplicity, it is contemplated that the wireless communication system 100 may include more BSs in some other embodiments of the present application. Similarly, although merely one UE is illustrated in FIG. 1 for simplicity, it is contemplated that the wireless communication system 100 may include more UEs in some other embodiments of the present application.

The BS 101 may also be referred to as an access point, an access terminal, a base, a macro cell, a node-B, an enhanced node B (eNB), a gNB, a home node-B, a relay node, or a device, or described using other terminology used in the art. The BS 101 is generally part of a radio access network that may include a controller communicably coupled to the BS 101.

The UE 103 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to an embodiment of the present application, the UE 103 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments, the UE 103 may include wearable devices, such as smart watches, fitness bands, optical head-mounted displays, or the like. Moreover, the UE 103 may be referred to as a subscriber unit, a mobile, a mobile station, a user, a terminal, a mobile terminal, a wireless terminal, a fixed terminal, a subscriber station, a user terminal, or a device, or described using other terminology used in the art.

The wireless communication system 100 is compatible with any type of network that is capable of sending and receiving wireless communication signals. For example, the wireless communication system 100 is compatible with a wireless communication network, a cellular telephone network, a time division multiple access (TDMA)-based network, a code division multiple access (CDMA)-based network, an orthogonal frequency division multiple access (OFDMA)-based network, an LTE network, a 3GPP-based network, a 3GPP 5G network, a satellite communications network, a high altitude platform network, and/or other communications networks.

In NR R17, MBS was introduced to focus on a small area mixed mode multicast. The work item on NR support of MBS was also agreed in R17 (refer to RP-201038), wherein three RRC states, i.e., RRC_IDLE state, RRC_INACTIVE state and RRC_CONNECTED state will be supported according to the following objectives:

Specify RAN basic functions for broadcast/multicast for UEs in RRC_CONNECTED state;

Specify RAN basic functions for broadcast/multicast for UEs in RRC_IDLE/RRC_INACTIVE states.

Specifically, for RRC_IDLE state and RRC_INACTIVE state, NR MBS will use a LTE single carrier-PTM (SC-PTM) liked scheme. According to the LTE SC-PTM liked scheme, MCCH will carry configuration information, e.g., a 5G MBS PTM Configuration message which indicates the active 5G MBS sessions and the scheduling information for each session (or bearer). The scheduling information may include: scheduling period, scheduling window and start offset etc. The information on MCCH will be periodically transmitted using a configurable repetition period. In addition, 5G MBS user data will be carried by a multicast traffic channel (MTCH) logical channel. Usually, the MCCH configuration is provided by system information, e.g., SIB, which may contain MCCH modification period, MCCH repetition period and MCCH subframe offset. In some special situations, the MCCH configuration may be provided by other adaptable manners. In addition, for RRC_CONNECTED state, the 5G MBS configuration information is provided to a UE by RRC dedicated signaling directly.

Generally, when state transition (or switching) from a first RRC state e.g., RRC_IDLE state to a second RRC state, e.g., RRC_CONNECTED state happens, BWP adaption from a BWP associated with the first RRC state to a BWP associated with the second RRC state will happen accordingly. Regarding BWP, it was firstly introduced for unicast in R15. A BWP is a contiguous set of physical resource blocks (PRBs) on a given carrier. These resource blocks are selected from a contiguous subset of the common resource blocks for a given numerology. Currently, three types of BWP are available, i.e., initial BWP, active BWP and default BWP. The initial BWP used for initial access is configured via system information. A UE can be configured with maximum 4 BWPs for downlink (DL) and uplink (UL), but at given time (e.g., a point in time or a time range) only one BWP is active for downlink and only one BWP is active for uplink. When an inactivity timer is configured for a serving cell, the expiry of the inactivity timer associated with this serving cell will switch the active BWP to a default BWP configured by the network side.

Figure 2:
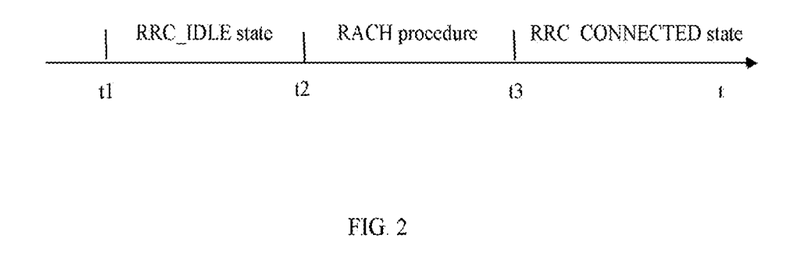
FIG. 2 illustrates an exemplary BWP adaption procedure due to state transition from RRC_IDLE state to RRC_CONNECTED state.

FIG. 2 illustrates an exemplary BWP adaption procedure due to state transition from RRC_IDLE state to RRC_CONNECTED state.

As shown in FIG. 2, at a first point in time domain, e.g., t1, a UE may go to idle to save power and keep being in RRC_IDLE state until a third point in time domain, e.g., t3. The UE is in RRC_IDLE state from t1 to t3. It may receive MBS data via a MBS BWP, e.g., a MBS BWP acquired from system information. At a second point in time domain, e.g., t2, the UE may start a random access channel (RACH) procedure, and perform an initial access via an initial BWP, which means that the UE cannot use the MBS BWP. That is, the MBS service reception for the UE is interrupted. At t3, based on a successful initial access, the UE may go into RRC_CONNECTED state, e.g., by receiving a RRCSetup message. A dedicated BWP is also configured for the UE. After that, in RRC_CONNECTED state, the UE will receive data via the dedicated BWP. Accordingly, the MBS service reception is resumed for the UE.

Thus, under current schemes, BWP adaption due to RRC state transition will cause MBS service interruption, which may further cause data loss and worsen delay. In addition, RRC state transition may also cause MBS configuration update, which will also interrupt MBS reception and worsen delay.

At least for solving the above technical problems, embodiments of the present application propose an improved technical solution for MBS. For example, according to some embodiments of the present application, a method and apparatus for MBS can ensure MBS service continuity during RRC state transition. According to some other embodiments of the present application, a method and apparatus for MBS can further optimize MBS configuration signaling during RRC state transition. According to some yet other embodiments of the present application, a method and apparatus for MBS can avoid data loss even if service interruption happens during RRC state transition.

Figure 3:
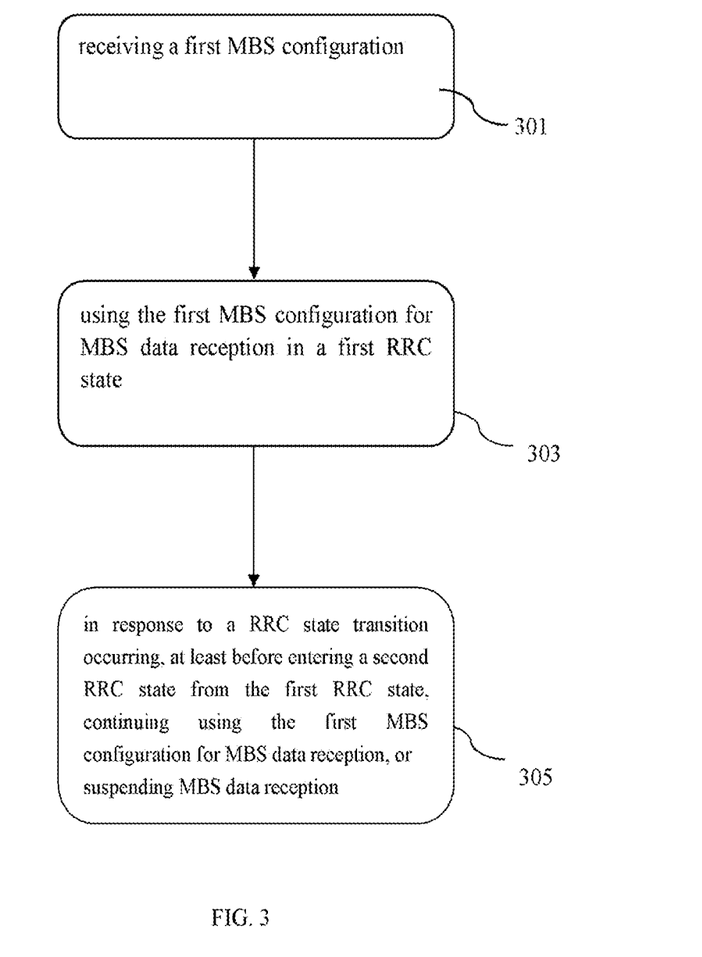
FIG. 3 is a flow chart illustrating an exemplary method for MBS according to some embodiments of the present application.

FIG. 3 is a flow chart illustrating an exemplary method for MBS according to some embodiments of the present application, which can be performed in the remote side, e.g., by a UE 103 or the like.

As shown in FIG. 3, a first MBS configuration is received, e.g., by the UE 103 from the network side in step 301. The first MBS configuration may be a 5G MBS configuration, which may include a temporary mobile group identity (TMGI) and an optional session identifier (ID), the associated group radio network temporary identifier (G-RNTI) and scheduling information for each 5G MBS service. In some embodiments of the present application, the first MBS configuration may be provided by MCCH or SIB. e.g., a common 5G MBS configuration provided by MCCH. The MCCH or SIB may also configure a MBS BWP for a group of UEs. In some other embodiments of the present application, the first MBS configuration may be a dedicated MBS configuration provided a dedicated RRC signalling for the UE 103. In some embodiments of the present application, the dedicated RRC signaling is a RRCSetup message with a dedicated BWP or a RRCResume message with a dedicated BWP.

The first MBS configuration is associated with a first RRC state. In step 303, the first MBS configuration may be used for MBS data reception by the UE 103 in the first RRC state. For example, in RRC_IDLE state or in RRC_INACTIVE state, the UE 103 may receive MBS data over the MBS BWP. In RRC_CONNECTED state, the UE 103 may receive MBS data over the dedicated BWP.

In step 305, in response to RRC state transition occurring, at least before entering a second RRC state from the first RRC state, the UE may continue using the first MBS configuration for the MBS data reception or suspend the MBS data reception. Details based on the basic solution may be different in view of different scenarios and other factors, e.g., BWP adaption and/or MBS configuration update etc.

For example, in some scenarios, the first RRC state is RRC_IDLE state or RRC_INACTIVE state, and the second RRC state is RRC_CONNECTED state. Mainly considering BWP adaption, an exemplary method may include: transmitting a MBS indication on MBS data reception during an initial access procedure. The MBS indication on MBS data reception is to indicate that a UE is receiving MBS data of one or more MBS sessions or the UE is interested in receiving the MBS data of one or more MBS sessions.

Mainly considering MBS configuration update, an exemplary method may include: continuing using the first MBS configuration for MBS data reception until entering the second RRC state. Another exemplary method may include: continuing using the first MBS configuration for MBS data reception until acquiring a second MBS configuration in the second RRC state. The second MBS configuration may indicate a second BWP compatible with a first BWP indicated in the first MBS configuration. Yet another exemplary method may include: continuing using the first MBS configuration for an existing MBS session until a new MBS session starting.

Acquiring the second MBS configuration can be performed in various manners. For example, according to some embodiments of the present application, acquiring the second MBS configuration may include: receiving full configuration of the second MBS configuration. According to some other embodiments of the present application, acquiring the second MBS configuration may include: receiving a different delta configuration of the second MBS configuration compared with the first MBS configuration; and updating a delta configuration of the first MBS configuration with the different delta configuration to achieve the second MBS configuration. According to some yet other embodiments of the present application, acquiring the second MBS configuration may include: receiving a keeping indication indicating still using the first MBS configuration for MBS data reception.

In some embodiments of the present application, mainly considering data loss in these scenarios, an exemplary method may include: transmitting a reception status report on MBS data in the second RRC state before suspending the MBS data reception or when resuming the MBS data reception; and receiving lost MBS data caused by suspending the MBS data reception.

In some scenarios, the first RRC state is RRC_CONNECTED state, and the second RRC state is RRC_IDLE state or RRC_INACTIVE state. An exemplary method may include: continuing using the first MBS configuration until one of the following occurs: a common MBS configuration is acquired; a MCCH or SIB for MBS configuration is updated; and a timer associated with the first MBS configuration expires.

Based on the above basic solution, more details will be illustrated in various embodiments hereafter. Considering the consistency between the remote side and network side, although some demonstrations in the specification are provided mainly in the remote side, persons skilled in the art should clearly understand how to apply them in the network side.

Figure 4:
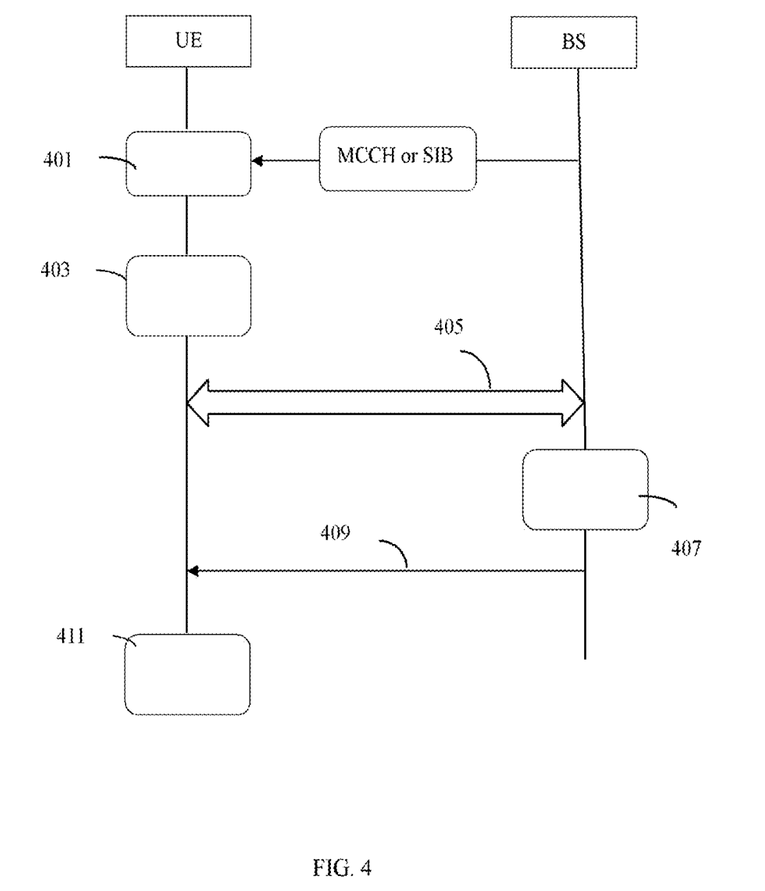
FIG. 4 is a flow chart illustrating an exemplary method for MBS during RRC state transition due to an initial access procedure according to some embodiments of the present application.

FIG. 4 is a flow chart illustrating an exemplary method for MBS during RRC state transition due to an initial access procedure according to some embodiments of the present application. Although the method is illustrated in a system level by a UE in a remote side (or UE side) and a BS in a network side (or BS side), persons skilled in the art can understand that the method implemented in the remote side and that implemented in the network side can be separately implemented and incorporated by other apparatus with the like functions.

Referring to FIG. 4, the UE is firstly assumed in RRC_INACTIVE state or in RRC_IDLE state. The UE can acquire the MBS BWP by reading the MCCH or SIB in step 401. The MCCH or SIB provides common MBS configuration, e.g., 5G common MBS configuration, which may include configuration for one or more MBS sessions. Thus, the UE can receive MBS data of the one or more MBS sessions from the BS via a MBS BWP in RRC_INACTIVE state or in RRC_IDLE state in step 403.

In step 405, the UE may start (or initiate) an initial access procedure via a DL initial BWP and UL initial BWP. The initial access procedure may be one of RRC Setup, RRC Resume and random access channel (RACH) procedures, wherein a RACH procedure may be a 4-step RACH procedure or a 2-step RACH procedure. For example, when upper layers of the UE request establishment of an RRC connection while the UE is in RRC_IDLE state, the UE may initiate a RACH procedure via an initial BWP. According to some embodiments of the present application, the MBS BWP includes the initial BWP, or is the same as the initial BWP, so that the UE can continue to receive MBS data via the MBS BWP when UE performs the initial access procedure. According to some other embodiments of the present application, the MBS BWP may be totally different from the initial BWP.

According to some embodiments of the present application, initiating the initial access procedure also means that a RRC state transition starts, i.e., transferring from RRC_INACTIVE state or RRC_IDLE state to RRC_CONNECTED state.

The UE may send a MBS indication during the initial access procedure to indicate that the UE is receiving the MBS data of one or more MBS sessions. In some other embodiments of the present application, the UE may directly initiate an initial access procedure without receiving MBS data (e.g., no steps 401 and 403), while the UE is interested in receiving MBS data in RRC_CONNECTED state. In this case, the MBS indication will indicate that the UE is interested in receiving the MBS data of one or more MBS sessions.

For example, when the initial access procedure is a 4-step RACH procedure, the UE may transmit the MBS indication in Msg 1 or Msg 3; while when the initial access procedure is a 2-step RACH procedure, the UE may transmit the MBS indication in Msg A. When the MBS indication is carried in Msg 1, the MBS indication may be a dedicated preamble or dedicated random access radio resource. In some embodiments of the present application, when the MBS indication is carried in Msg 3, the MBS indication can be in a RRCRequest message or a RRCResumeRequest message. One bit can be added in the RRCRequest message or the RRCResumeRequest message compared with current RRCRequest message or RRCResumeRequest message. In some other embodiments of the present application, when the MBS indication is carried in Msg 3, the MBS indication can be a new type media access control (MAC) control element (CE) included in Msg3 or in MsgA, which may be referred to as "MBS indication MAC CE." The MBS indication MAC CE can also include the MBS session information e.g. TMGI, which the UE is receiving or is interested in receiving.

When the BS receives the MBS indication, the BS will know that the UE is receiving MBS service or that the UE is interested in receiving MBS service. In step 407, the BS may configure a dedicated BWP for the UE after a successful initial access procedure in step 405, which can also be used for receiving MBS service. The dedicated BWP may be compatible with the MBS BWP used by the UE in the previous RRC state, e.g., RRC_IDLE state or RRC_INACTIVE state. For example, the dedicated BWP is the same as the MBS BWP or includes the MBS BWP, so that the UE can continue receiving the MBS service without BWP switching. For example, the dedicated BWP is overlapping with the MBS BWP.

The BS will send configuration of the dedicated BWP to the UE in step 409. The BS may transmit the configuration of the dedicated BWP separately or together with a RRC signalling, e.g., via a RRCSetup message or a RRCResume message etc., which depends on the type of the initial access procedure.

In some embodiments of the present application, when the UE receives a RRCSetup message or RRCResume message, it means that the UE enters RRC_CONNECTED state. That is, the RRC state transition is finished. In some other embodiments of the present application, entering RRC_CONNECTED state may be identified by other messages or signaling. In step 411, the UE can use the dedicated BWP for MBS data reception in RRC_CONNECTED state. The UE can also use the dedicated BWP for other data reception and transmission.

In the embodiment illustrated in FIG. 4, BWP adaption is mainly considered during the RRC state transition. However, besides BWP for MBS, MBS configuration also provides other configuration information for MBS. In different RRC state, the MBS configuration may be different. For example, in RRC_IDLE state or RRC_INACTIVE state, a UE may receive MBS service using the common MBS configuration, e.g., 5G MBS configuration provided by MCCH or by SIB; while in RRC_CONNECTED state, the UE may use the dedicated MBS configuration, e.g., 5G MBS configuration provided by dedicated RRC signaling. Thus, how to handle the MBS configuration update during RRC state transition should also be considered.

Figure 5:
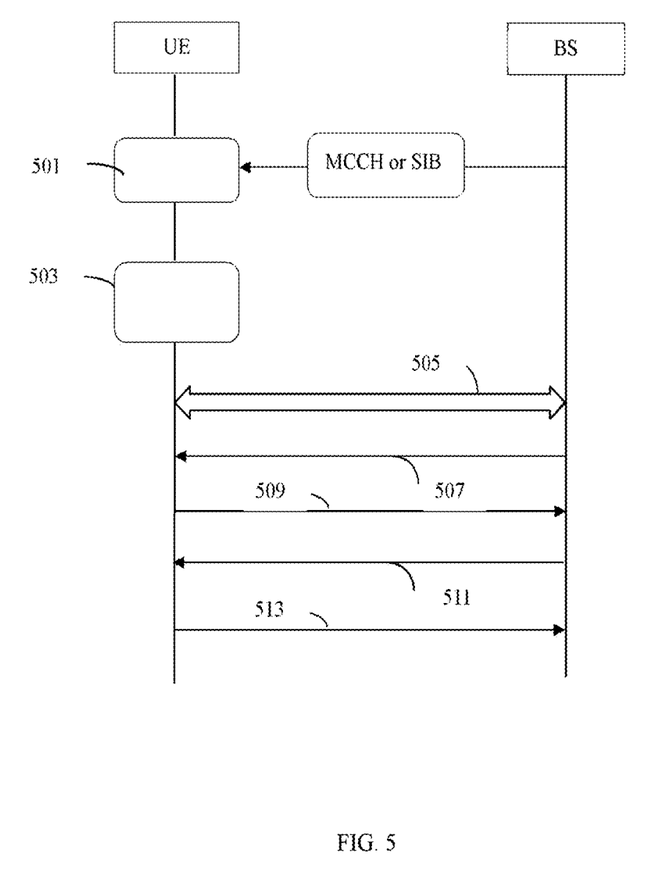
FIG. 5 is a flow chart illustrating an exemplary method for MBS during RRC state transition due to an initial access procedure according to some other embodiments of the present application.

FIG. 5 is a flow chart illustrating an exemplary method for MBS during RRC state transition due to an initial access procedure according to some other embodiments of the present application. Although the method is illustrated in a system level by a UE in a remote side (or UE side) and a BS in a network side (or BS side), persons skilled in the art can understand that the method implemented in the remote side and that implemented in the network side can be separately implemented and incorporated by other apparatus with the like functions.

Referring to FIG. 5, the UE is firstly assumed in RRC_INACTIVE state or in RRC_IDLE state. The UE can acquire common MBS configuration, e.g., 5G common MBS configuration from the MCCH or SIB in step 501. The common MBS configuration is for one or more MBS sessions. The UE can also acquire the MBS BWP configuration from the MCCH or SIB. Based on the common MBS configuration, the UE can receive MBS data of the one or more MBS sessions from the BS via the MBS BWP in RRC_INACTIVE state or in RRC_IDLE state in step 503.

In step 505, the UE may start (or initiate) an initial access procedure. The initial access procedure may be one of RRC Setup, RRC Resume and random access channel (RACH) procedures, wherein a RACH procedure may be a 4-step RACH procedure or a 2-step RACH procedure. For example, when upper layers of the UE request establishment of an RRC connection while the UE is in RRC_IDLE state, the UE may initiate a RACH procedure via an initial BWP. According to some embodiments of the present application, the MBS BWP includes the initial BWP, or is the same as the initial BWP, so that the UE can continue to receive MBS data via the MBS BWP when UE performs the initial access procedure. According to some other embodiments of the present application, the MBS BWP may be totally different from the initial BWP.

After a successful initial access procedure in step 505, e.g., a RACH procedure, the BS may send a RRCSetup message to the UE in step 507. In response to the RRCSetup message, the UE will send a corresponding message, e.g., RRCSetupComplete message to the BS in step 509. In other embodiments of the present application, the message transmitted between the BS and UE may be other messages, for example a RRCResume message from the BS to UE or RRCResumeComplete message from the UE to BS. When the UE receives the RRCSetup message or RRCResume message, it means that the UE enters RRC_CONNECTED state. That is, the RRC state transition is finished. In some other embodiments of the present application, entering RRC_CONNECTED state may be identified by other messages or signaling.

To reduce the service interruption, the UE can continue using the common MBS configuration during the RRC state transition. In some embodiments of the present application, the UE may continue using the common MBS configuration even after the RRC state transition.

For example, according to some embodiments of the present application, the UE may continue using the common MBS configuration until the UE enters RRC_CONNECTED state, e.g. until receiving a RRCSetup message or RRCResume message. The UE will continue monitoring the SIB and/or MCCH to acquire the updated common MBS configuration. After receiving RRCSetup message, the UE may stop monitoring MCCH. The UE may also release the MCCH configuration in some embodiments of the present application.

According to some embodiments of the present application, the UE may continue using the common MBS configuration until receiving the dedicated MBS configuration, e.g., 5G MBS configuration. For example, the UE will continue monitoring the SIB and MCCH to acquire the updated common MBS configuration until receiving the dedicated MBS configuration. If not receiving the dedicated MBS configuration, the UE may use the common MBS configuration even after it enters RRC_CONNECTED state. The dedicated MBS configuration may indicate a dedicated BWP, which is compatible with the MBS BWP acquired from the common MBS configuration. After receiving the dedicated MBS configuration, the UE may stop monitoring MCCH. The UE may also release the MCCH configuration in some embodiments of the present application.

Referring to FIG. 5, the UE may receive the dedicated MBS configuration in step 511, e.g., dedicated 5G MBS configuration indicated by a dedicated RRC signaling. For example, the dedicated MBS configuration can be provided in a RRCReconfiguration message. The UE will use the received dedicated MBS configuration for MBS service. In response to the RRCReconfiguration message, the UE may transmit a RRCReconfigurationComplete message in step 513.

According to some yet other embodiments of the present application, the UE may continue using the common 5G MBS configuration for existing MBS session(s) even after the UE enters RRC_CONNECTED state. Even if the UE has received the dedicated MBS configuration, the dedicated 5G MBS configuration will not be used for existing MBS session(s) and will be used for a new MBS session starting when the UE is in RRC_CONNECTED state.

Although BWP adaption is not illustrated in FIG. 5, persons skilled in the art should understand that the BWP adaption scheme, e.g., that illustrated in FIG. 4 can be incorporated with the MBS configuration update scheme, e.g., that illustrated in FIG. 5.

Besides the service continuity, signaling optimization for MBS configuration update is also considered in some embodiments of the present application. During RRC state transition from RRC_IDLE state or RRC_INACTIVE state to RRC_CONNECTED state, at least part of the common MBS configuration can be reused for the dedicated MBS configuration.

Figure 6:
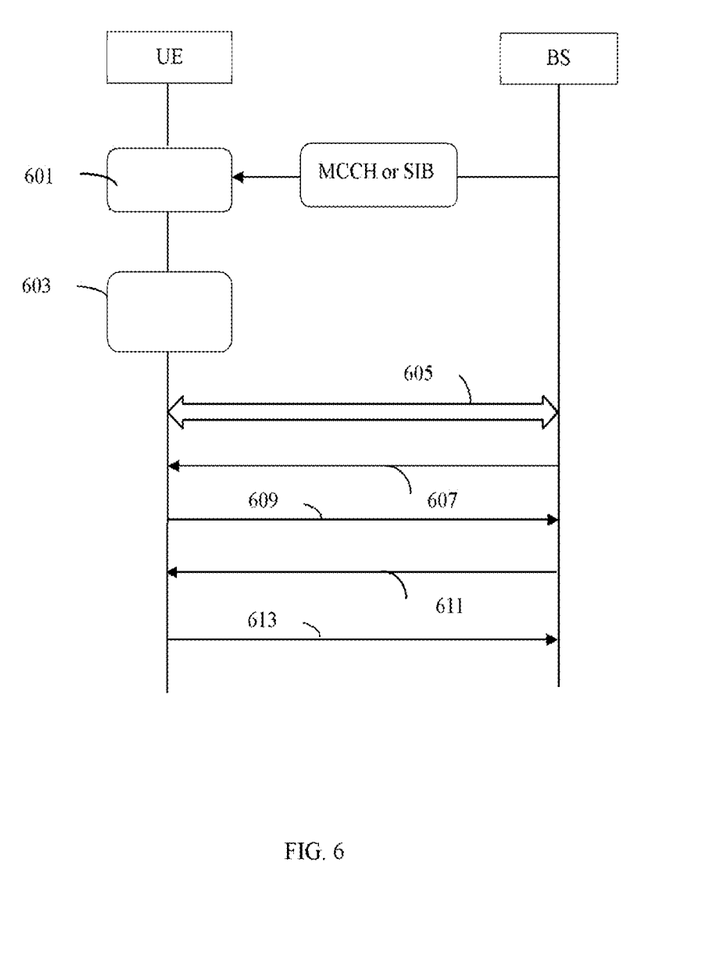
FIG. 6 is a flow chart illustrating an exemplary method for MBS during RRC state transition due to an initial access procedure according to some yet other embodiments of the present application.

FIG. 6 is a flow chart illustrating an exemplary method for MBS during RRC state transition due to an initial access procedure according to some yet other embodiments of the present application. Although the method is illustrated in a system level by a UE in a remote side (or UE side) and a BS in a network side (or BS side), persons skilled in the art can understand that the method implemented in the remote side and that implemented in the network side can be separately implemented and incorporated by other apparatus with the like functions.

Referring to FIG. 6, similarly, the UE is firstly assumed in RRC_INACTIVE state or in RRC_IDLE state. The UE can acquire common MBS configuration, e.g., 5G common MBS configuration from the MCCH or SIB in step 601. The common MBS configuration is for one or more MBS sessions. The UE can also acquire the MBS BWP configuration from the MCCH or SIB. Based on the common MBS configuration, the UE can receive MBS data of the one or more MBS sessions from the BS via the MBS BWP in RRC_INACTIVE state or in RRC_IDLE state in step 603.

In step 605, the UE may start (or initiate) an initial access procedure via a DL initial BWP and UL initial BWP. The initial access procedure may be one of RRC Setup, RRC Resume and random access channel (RACH) procedures, wherein a RACH procedure may be a 4-step RACH procedure or a 2-step RACH procedure. For example, when upper layers of the UE request establishment of an RRC connection while the UE is in RRC_IDLE state, the UE may initiate a RACH procedure via an initial BWP. According to some embodiments of the present application, the MBS BWP includes the initial BWP, or is the same as the initial BWP, so that the UE can continue to receive MBS data via the MBS BWP when UE performs the initial access procedure. According to some other embodiments of the present application, the MBS BWP may be totally different from the initial BWP.

After a successful initial access procedure in step 605, e.g., a RACH procedure, the BS may send a RRCSetup message to the UE in step 607. In response to the RRCSetup message, the UE will send a corresponding message, e.g., RRCSetupComplete message to the BS in step 609. In other embodiments of the present application, the message transmitted between the BS and UE may be other messages, for example a RRCResume message from the BS to UE or RRCResumeComplete message from the UE to BS. When the UE receives the RRCSetup message or RRCResume message, it means that the UE enters RRC_CONNECTED state. That is, the RRC state transition is finished. In some other embodiments of the present application, entering RRC_CONNECTED state may be identified by other messages or signaling.

The BS will configure dedicated MBS configuration for the UE, and transmit the dedicated MBS configuration to the UE in step 611. The dedicated MBS configuration may indicate a dedicated BWP, which is compatible with the MBS BWP acquired from the common MBS configuration. In response to the received configuration information, e.g., via the RRCReconfiguration message, the UE may transmit a corresponding feedback message, e.g., RRCReconfigurationComplete message to the UE in step 613.

The dedicated MBS can be configured for the UE via various manners. For example, the BS may transmit the full configuration of the dedicated MBS configuration to the UE in step 611, e.g., via a RRCReconfiguration message. The dedicated MBS configuration may be the same or different from the common MBS configuration. The UE may receive the full configuration of the dedicated MBS configuration accordingly. In some other embodiments of the present application, the BS may only transmit the different delta configuration of the dedicated MBS configuration compared with the common MBS configuration in step 611. After receiving the delta configuration of the dedicated MBS configuration, the UE will update the delta configuration of the common MBS configuration with the different delta configuration to achieve the dedicated MBS configuration. Accordingly, signaling overhead on the dedicated MBS configuration will be reduced. In some yet other embodiments of the present application, the BS may just send a keeping indication to the UE in step 611 to indicate the UE to still use the common MBS configuration in RRC_CONNECTED state. After receiving the keeping indication, the UE will treat the latest stored common MBS configuration as the dedicated MBS configuration.

When the UE starts to use the dedicated MBS configuration, the UE may stop monitoring MCCH. The UE may also release the MCCH configuration in some embodiments of the present application. In some other embodiments of the present application, the UE will start to use the dedicated MBS configuration without considering service continuity due to BWP adaption and/or MBS configuration update. In some other embodiments of the present application, the time that the UE starts to use the dedicated MBS configuration will be determined with concerns on service continuity, which can refer to the solutions illustrated in view of FIG. 4 and FIG. 5. For example, the UE may continue using the common MBS configuration until receiving the dedicated MBS configuration, e.g., 5G MBS configuration. The UE will start to use the dedicated MBS configuration after receiving the dedicated MBS configuration. In another example, the UE may continue using the common MBS configuration for existing MBS session, and start to use the dedicated MBS configuration for new MBS session (s) in RRC_CONNECTED state. In some other embodiments of the present application, the BWP adaption scheme, e.g., that illustrated in FIG. 4 can also incorporate with that illustrated in at least one of FIG. 5 and FIG. 6.

In addition, in RRC_IDLE state or in RRC_INACTIVE state, to receive MBS service, a UE needs to acquire common MBS configuration from MCCH or SIB. For example, the UE reads SIB to acquire MCCH configuration firstly, and then reads common MBS configuration, e.g., 5G common MBS configuration from the MCCH configuration. The acquiring procedure of common MBS configuration may cause large delay for receiving MBS data, and should be improved.

Figure 7:
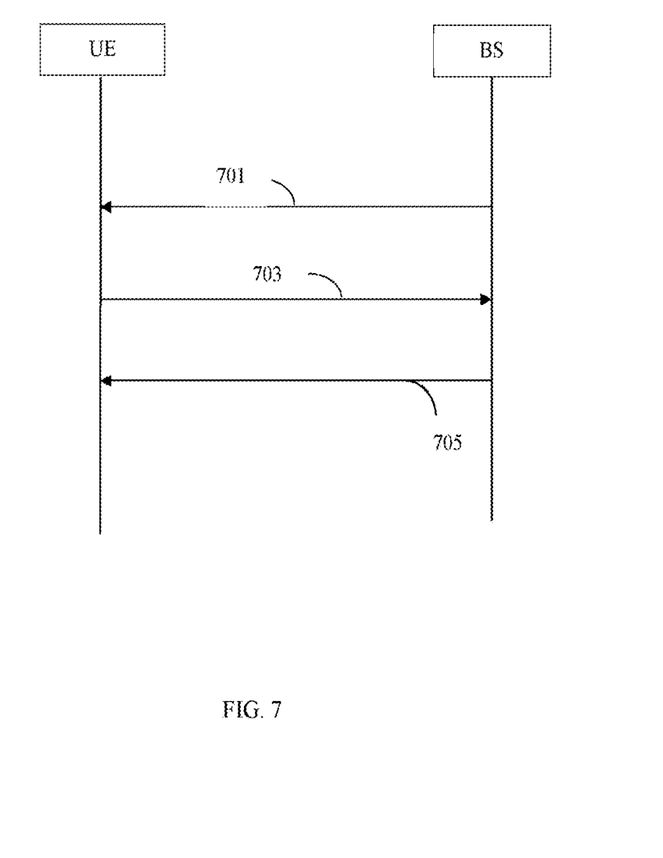
FIG. 7 is a flow chart illustrating an exemplary method for MBS during RRC state transition from RRC_CONNECTED state to one of RRC_IDLE and RRC_INACTIVE state according to some yet other embodiments of the present application.

FIG. 7 is a flow chart illustrating an exemplary method for MBS during RRC state transition from RRC_CONNECTED state to one of RRC_IDLE and RRC_INACTIVE state according to some embodiments of the present application. Although the method is illustrated in a system level by a UE in a remote side (or UE side) and a BS in a network side (or BS side), persons skilled in the art can understand that the method implemented in the remote side and that implemented in the network side can be separately implemented and incorporated by other apparatus with the like functions.

Referring to FIG. 7, the UE is firstly assumed in RRC_CONNECTED state. In step 701, the UE receives dedicated MBS configuration from the BS, e.g., 5G dedicated MBS configuration. For example, the dedicated MBS configuration may be transmitted from the BS via a RRCReconfiguration message. The UE will use the dedicated MBS configuration for MBS data reception in RRC_CONNECTED state. In response to the received dedicated MBS configuration, e.g., via a RRCReconfiguration message, the UE may transmit a corresponding feedback message to the BS in step 703, e.g., a RRCReconfigurationComplete message.

When the UE decides to go to sleep or becomes inactive for a BS, the BS may transmit a RRCRelease message to the UE in step 705. Accordingly, the UE will transfer from RRC_CONNECTED state to RRC_IDLE state or RRC_INACTIVE state. The BS may also transmit a dedicated MBS configuration in the RRCRelease message. The dedicated MBS configuration may be the same or different from that previously used in RRC_CONNECTED state. In some embodiments of the present application, the BS may also transmit MCCH configuration in the RRCRelease message so that the UE does not need to acquire common MBS configuration. In some other embodiments of the present application, it may be predefined in the specification that the UE will continue using the dedicated MBS configuration in the case of transferring from RRC_CONNECTED state to RRC_IDLE state or RRC_INACTIVE state.

The time that stopping using the dedicated MBS configuration may be different according to different embodiments of the present application. For example, according to some embodiments of the present application, when transferring from the RRC_CONNECTED state to the RRC_IDLE state or RRC_INACTIVE state, the UE will continue using the dedicated MBS configuration until the UE acquires the common MBS configuration from MCCH or SIB.

According to some other embodiments of the present application, when transferring from the RRC_CONNECTED state to the RRC_IDLE state or RRC_INACTIVE state, the UE will continue using the dedicated MBS configuration until the MCCH or SIB is updated.

According to some yet other embodiments of the present application, the BS may configure a timer or a valid time period for a dedicated MBS configuration used by the UE. When transferring from the RRC_CONNECTED state to the RRC_IDLE state or RRC_INACTIVE state, the UE will continue using the dedicated MBS configuration until the timer or valid time period expires.

Data loss is considered in some embodiments of the present application. Even if the MBS service is not continuous for the UE due to RRC state transition from the RRC_IDLE state or RRC_INACTIVE state to the RRC_CONNECTED state, the UE can obtain the lost MBS data or service(s) after entering RRC_CONNECTED state. Accordingly, data loss due to RRC state transition is avoided.

Figure 8:
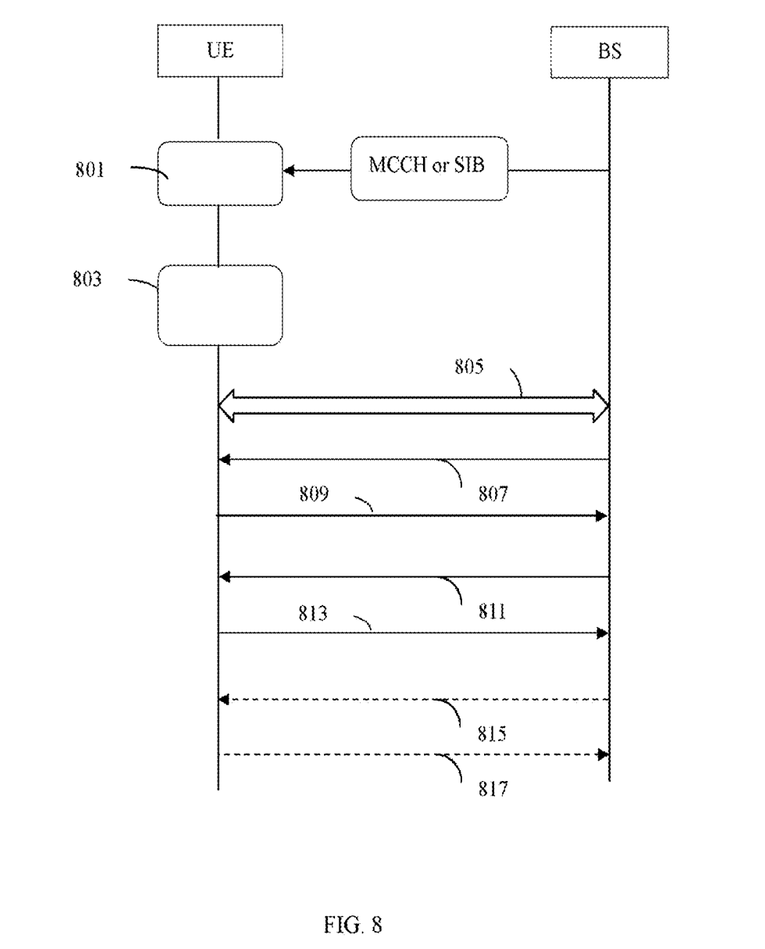
FIG. 8 is a flow chart illustrating an exemplary method for MBS during RRC state transition due to an initial access procedure according to some yet other embodiments of the present application.

FIG. 8 is a flow chart illustrating an exemplary method for MBS during RRC state transition due to an initial access procedure according to some other embodiments of the present application. Although the method is illustrated in a system level by a UE in a remote side (or UE side) and a BS in a network side (or BS side), persons skilled in the art can understand that the method implemented in the remote side and that implemented in the network side can be separately implemented and incorporated by other apparatus with the like functions.

Referring to FIG. 8, the UE is firstly assumed in RRC_INACTIVE state or in RRC_IDLE state. The UE can acquire common MBS configuration, e.g., 5G common MBS configuration from the MCCH or SIB in step 801. The common MBS configuration is for one or more MBS sessions. The UE can also acquire the MBS BWP configuration from the MCCH or SIB. Based on the common MBS configuration, the UE can receive MBS data of the one or more MBS sessions from the BS via the MBS BWP in RRC_INACTIVE state or in RRC_IDLE state in step 803.

In step 805, the UE may start (or initiate) an initial access procedure via a DL initial BWP and UL initial BWP. The initial access procedure may be one of RRC Setup, RRC Resume and random access channel (RACH) procedures, wherein a RACH procedure may be a 4-step RACH procedure or a 2-step RACH procedure. For example, when upper layers of the UE request establishment of an RRC connection while the UE is in RRC_IDLE state, the UE may initiate a RACH procedure via an initial BWP. According to some embodiments of the present application, the MBS BWP includes the initial BWP, or is the same as the initial BWP, so that the UE can continue to receive MBS data via the MBS BWP when UE performs the initial access procedure. According to some other embodiments of the present application, the MBS BWP may be totally different from the initial BWP.

According to some embodiments of the present application, when starting the initial access procedure, the UE may also suspend the MBS data reception, e.g., suspending all related MBS RBs. That is, the UE temporally stops receiving MBS data. In some other embodiments of the present application, the UE may continue receiving MBS data when initiating the initial access procedure, while suspend the MBS data reception when just entering RRC_CONNECTED state, e.g., receiving a RRCSetup message or RRCResume message.

After a successful initial access procedure in step 805, e.g., a RACH procedure, the BS may send a RRCSetup message to the UE in step 807. In response to the RRCSetup message, the UE will send a corresponding message, e.g., RRCSetupComplete message to the BS in step 809. In other embodiments of the present application, the message transmitted between the BS and UE may be other messages, for example a RRCResume message from the BS to UE or RRCResumeComplete message from the UE to BS. When the UE receives the RRCSetup message or RRCResume message, it means that the UE enters RRC_CONNECTED state. That is, the RRC state transition is finished. In some other embodiments of the present application, entering RRC_CONNECTED state may be identified by other messages or signaling.

The BS will configure dedicated MBS configuration for the UE, and transmit the dedicated MBS configuration to the UE in step 811. The dedicated MBS configuration may indicate a dedicated BWP, which is compatible with the MBS BWP acquired from the common MBS configuration. In response to the received configuration information, e.g., via the RRCReconfiguration message, the UE may transmit a corresponding feedback message, e.g., RRCReconfigurationComplete message to the UE in step 813.

The dedicated MBS can be configured for the UE via various manners. For example, the BS may transmit the full configuration of the dedicated MBS configuration to the UE in step 811, e.g., via a RRCReconfiguration message. The dedicated MBS configuration may be the same or different from the common MBS configuration. The UE may receive the full configuration of the dedicated MBS configuration accordingly. The UE removes the common configuration and uses the full configuration for reception of 5G MBS. In some other embodiments of the present application, the BS may only transmit the different delta configuration of the dedicated MBS configuration compared with the common MBS configuration in step 811. After receiving the delta configuration of the dedicated MBS configuration, the UE will update the delta configuration of the common MBS configuration with the different delta configuration to achieve the dedicated MBS configuration. Accordingly, signaling overhead on the dedicated MBS configuration will be reduced. In some yet other embodiments of the present application, the BS may just send a keeping indication to the UE in step 811 to indicate the UE to still use the common MBS configuration in RRC_CONNECTED state. After receiving the keeping indication, the UE will treat the latest stored common MBS configuration as the dedicated MBS configuration.

When the UE starts to use the dedicated MBS configuration for MBS service, the UE may stop monitoring MCCH. The UE may also release the MCCH configuration in some embodiments of the present application.

For the MBS data lost due to suspending the MBS reception, the UE will report the BS to resume them. For example, when the UE needs to resume the MBS data in RRC_CONNECTED state, the UE will transmit a reception status report on MBS data in step 815. The reception status report may include the maximum serial number of receiving packets in sequence, or the bitmap of the receiving packets status. The bitmap may indicate which packets are missing and which packets are correctly received, or indicate the first missing packets, or indicate the receiving status in MRB and the receiving status in DRB etc. After receiving the reception status report, the BS will know the data receiving status in the UE. The BS will send the missing data to the UE in step 817.

For example, a common PDCP entity can be used for all RRC states, e.g., RRC_IDLE state, RRC_INACTIVE state and RRC_CONNECTED state. The UE may transmit a PDCP status report indicating the reception status to the BS in step 815. After receiving the PDCP status report, the BS will determine the lost MBS data. In step 817, the BS will transmit the lost MBS data by a dedicated bearer or PTP bearer.

In addition, although the reception status report on MBS data transmitted in step 815 is arranged after step 813 in FIG. 8, persons skilled in the art should understand that it can be transmitted in other occasions. For example, the UE may transmit the reception status report when suspending the MBS data reception.

Embodiments of the present application also propose an apparatus for MBS. For example, FIG. 9 illustrates a block diagram of an apparatus 900 for MBS according to some embodiments of the present application.

Figure 9:
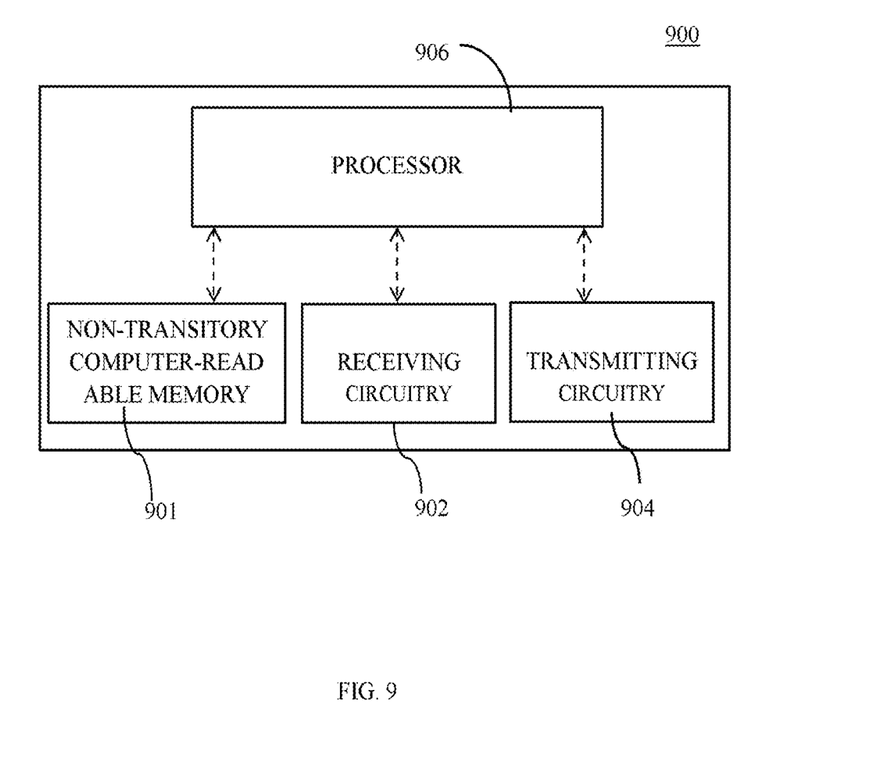
FIG. 9 illustrates a block diagram of an exemplary apparatus according to some embodiments of the present application.

As shown in FIG. 9, the apparatus 900 may include at least one non-transitory computer-readable medium 901, at least one receiving circuitry 902, at least one transmitting circuitry 904, and at least one processor 906 coupled to the non-transitory computer-readable medium 901, the receiving circuitry 902 and the transmitting circuitry 904. The apparatus 900 may be a network side apparatus (e.g., a BS) configured to perform a method illustrated in any of FIGS. 4-8, or the like, or a remote unit (e.g., a UE) configured to perform a method illustrated in any of FIGS. 3-8, or the like.

Although in this figure, elements such as the at least one processor 906, transmitting circuitry 904, and receiving circuitry 902 are described in the singular, the plural is contemplated unless a limitation to the singular is explicitly stated. In some embodiments of the present application, the receiving circuitry 902 and the transmitting circuitry 904 can be combined into a single device, such as a transceiver. In certain embodiments of the present application, the apparatus 900 may further include an input device, a memory, and/or other components.

For example, in some embodiments of the present application, the non-transitory computer-readable medium 901 may have stored thereon computer-executable instructions to cause a processor to implement the method with respect to the UE as described above. For example, the computer-executable instructions, when executed, cause the processor 906 interacting with receiving circuitry 902 and transmitting circuitry 904, so as to perform the steps with respect to the UE depicted in any of FIGS. 3-8.

In some embodiments of the present application, the non-transitory computer-readable medium 901 may have stored thereon computer-executable instructions to cause a processor to implement the method with respect to the BS as described above. For example, the computer-executable instructions, when executed, cause the processor 906 interacting with receiving circuitry 902 and transmitting circuitry 904, so as to perform the steps with respect to the BS depicted in any of FIGS. 4-8.

The method according to embodiments of the present application can also be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this application. For example, an embodiment of the present application provides an apparatus for NBS, including a processor and a memory. Computer programmable instructions for implementing a method are stored in the memory, and the processor is configured to perform the computer programmable instructions to implement the method. The method may be a method as stated above or other method according to an embodiment of the present application.

An alternative embodiment preferably implements the methods according to embodiments of the present application in a non-transitory, computer-readable storage medium storing computer programmable instructions. The instructions are preferably executed by computer-executable components preferably integrated with a network security system. The non-transitory, computer-readable storage medium may be stored on any suitable computer readable media such as RAMs, ROMs, flash memory, EEPROMs, optical storage devices (CD or DVD), hard drives, floppy drives, or any suitable device. The computer-executable component is preferably a processor but the instructions may alternatively or additionally be executed by any suitable dedicated hardware device. For example, an embodiment of the present application provides a non-transitory, computer-readable storage medium having computer programmable instructions stored therein. The computer programmable instructions are configured to implement a method as stated above or other method according to an embodiment of the present application.

In addition, in this disclosure, relational terms such as "first," "second," and the like may be used solely to distinguish one entity or action from another entity or action without necessarily requiring or implying any actual such relationship or order between such entities or actions. The terms "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for the operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

What is claimed is:

1. A user equipment (UE) for wireless communication, comprising:
   at least one memory; and
   at least one processor coupled with the at least one memory and configured to cause the UE to:
      receive a first multicast and broadcast services (MBS) configuration;
      use the first MBS configuration for MBS data reception in a first radio resource control (RRC) state if the first RRC state is one of RRC_IDLE state or RRC_INACTIVE state;
      perform, in response to a RRC state transition occurring, at least before entering RRC_CONNECTED state from the first RRC state, one or more of continue using the first MBS configuration for MBS data reception, or suspend the MBS data reception;
      transmit a reception status report on MBS data in the RRC_CONNECTED state before suspending the MBS data reception or when resuming the MBS data reception; and
      receive lost MBS data caused by suspending the MBS data reception.

2. The UE of claim 1, wherein, if the first RRC state is one of RRC_IDLE state or RRC_INACTIVE state, and the second RRC state is RRC_CONNECTED state, the at least one processor is configured to cause the UE to:
   transmit a MBS indication of MBS data reception during an initial access procedure, wherein the MBS indication of the MBS data reception comprises an indication of a user equipment (UE) is one or more of receiving MBS data of one or more MBS sessions or configured to receive the MBS data of the one or more MBS sessions.

3. The UE of claim 1, wherein, if the first RRC state is one of RRC_IDLE state or RRC_INACTIVE state, and the second RRC state is RRC_CONNECTED state, the at least one processor is configured to cause the UE to continue using the first MBS configuration for MBS data reception until entering the second RRC state.

4. The UE of claim 1, wherein, if the first RRC state is one of RRC_IDLE state or RRC_INACTIVE state, and the second RRC state is RRC_CONNECTED state, the at least one processor is configured to cause the UE to continue using the first MBS configuration for MBS data reception until acquiring a second MBS configuration in the second RRC state.

5. The UE of claim 1, wherein, if the first RRC state is one of RRC_IDLE state or RRC_INACTIVE state, and the second RRC state is RRC_CONNECTED state, the at least one processor is configured to cause the UE to continue using the first MBS configuration for an existing MBS session until a new MBS session starts.

6. The UE of claim 4, wherein the first MBS configuration indicates a first MBS bandwidth part (BWP), and the second MBS configuration indicates a second MBS BWP compatible with the first MBS BWP.

7. The UE of claim 6, wherein to acquire the second MBS configuration, the at least one processor is configured to cause the UE to receive full configuration of the second MBS configuration.

8. The UE of claim 6, wherein to acquire the second MBS configuration, the at least one processor is configured to cause the UE to:
   receive a different delta configuration of the second MBS configuration compared with the first MBS configuration; and
   update a delta configuration of the first MBS configuration with the different delta configuration to achieve the second MBS configuration.

9. The UE of claim 6, wherein to acquire the second MBS configuration, the at least one processor is configured to cause the UE to receive a keeping indication indicating to still use the first MBS configuration for MBS data reception.

10. The UE of claim 1, wherein, if the first RRC state is RRC_CONNECTED state, and the second RRC state is one of RRC_IDLE state or RRC_INACTIVE state, the at least one processor is configured to cause the UE to continue using the first MBS configuration until at least one of:
   a common MBS configuration is acquired;
   a multicast control channel (MCCH) or system information block (SIB) for MBS configuration is updated; or
   a timer associated with the first MBS configuration expires.

11. The UE of claim 1, wherein the reception status report of MBS data comprises a packet data convergence protocol (PDCP) status report.

12. The UE of claim 1, wherein the lost MBS data is received by one or more of a dedicated bearer or a point to point (PTP) bearer.

13. The UE of claim 1, wherein, if the second RRC state is RRC_CONNECTED state, entering the second RRC state is identified by receiving one or more of a RRCSetup message or a RRCResume message.

14. A method performed by a user equipment (UE), the method comprising:
   receiving a first multicast and broadcast services (MBS) configuration;
   using the first MBS configuration for MBS data reception in a first radio resource control (RRC) state if the first RRC state is one of RRC_IDLE state or RRC_INACTIVE state;
   in response to a RRC state transition occurring, at least before entering RRC_CONNECTED state from the first RRC state, one or more of continuing using the first MBS configuration for MBS data reception, or suspend the MBS data reception;

transmitting a reception status report on MBS data in the RRC_CONNECTED state before suspending the MBS data reception or when resuming the MBS data reception; and receiving lost MBS data caused by suspending the MBS data reception.

15. The method of claim 14, wherein, if the first RRC state is one of RRC_IDLE state or RRC_INACTIVE state, and the second RRC state is RRC_CONNECTED state, the method further comprising:

transmitting a MBS indication of MBS data reception during an initial access procedure, wherein the MBS indication of MBS data reception comprises an indication that that a user equipment (UE) is one or more of receiving MBS data of one or more MBS sessions or configured to receive the MBS data of the one or more MBS sessions.

16. The method of claim 14, wherein, if the first RRC state is one of RRC_IDLE state or RRC_INACTIVE state, and the second RRC state is RRC_CONNECTED state, the method further comprising:

continuing using the first MBS configuration for MBS data reception until entering the second RRC state.

17. The method of claim 14, wherein, if the first RRC state is one of RRC_IDLE state or RRC_INACTIVE state, and the second RRC state is RRC_CONNECTED state, the method further comprising:

continuing using the first MBS configuration for MBS data reception until a second MBS configuration is acquired in the second RRC state.

18. The method of claim 14, wherein, if the first RRC state is one of RRC_IDLE state or RRC_INACTIVE state, and the second RRC state is RRC_CONNECTED state, the method further comprising:

continuing using the first MBS configuration for an existing MBS session until a new MBS session starts.

19. A base station for wireless communication, comprising:

at least one memory; and at least one processor coupled with the at least one memory and configured to cause the base station to:

transmit, to a user equipment (UE), a multicast and broadcast services (MBS) configuration;

receive, from the UE and via an initial bandwidth part (BWP), an MBS indication indicating that the UE is one or more of receiving MBS service or configured to receive the MBS service;

configure a dedicated BWP for the UE to receive the MBS service;

transmit, to the UE, a configuration of the dedicated BWP;

receive a reception status report on the MBS service before suspending the configuration of the dedicated BWP; and transmit lost MBS data caused by suspending the configuration of the dedicated BWP.

20. A method performed by a base station (BS), the method comprising:

transmit, to a user equipment (UE), a multicast and broadcast services (MBS) configuration;

receive, from the UE and via an initial bandwidth part (BWP), an MBS indication indicating that the UE is one or more of receiving MBS service or configured to receive the MBS service;

configure a dedicated BWP for the UE to receive the MBS service;

transmit, to the UE, a configuration of the dedicated BWP;

receive a reception status report on the MBS service before suspending the configuration of the dedicated BWP; and transmit lost MBS data caused by suspending the configuration of the dedicated BWP.

* * * * *